Dec. 30, 1969 D. J. MARTIN 3,487,366

REMOTE ELEMENT SELECTION SYSTEMS

Filed June 7, 1965 2 Sheets-Sheet 1

Inventor
David James Reginald Martin
Stevens, Davis, Miller & Mosher
Attorneys

Dec. 30, 1969 D. J. MARTIN 3,487,366

REMOTE ELEMENT SELECTION SYSTEMS

Filed June 7, 1965 2 Sheets-Sheet 2

Inventor
David James Reginald Martin
Stevens, Davis, Miller & Mosher
Attorneys

United States Patent Office 3,487,366

Patented Dec. 30, 1969

3,487,366

REMOTE ELEMENT SELECTION SYSTEMS

David James Martin, Worthing, Sussex, England, assignor to Coal Industry (Patents) Limited, London, England, a company of Great Britain Filed June 7, 1965, Ser. No. 461,913
Claims priority, application Great Britain, June 16, 1964, 24,952/64
Int. Cl. H04q *1/00, 3/00;* H04m *11/04*
U.S. Cl. 340—147 3 Claims

ABSTRACT OF THE DISCLOSURE

An electrical selection system for enabling selection of any of a plurality of control devices from a remote control station. In this system each device is control wise connected to an associated electronic switch which is responsive to the simultaneous receipt of alternating and direct voltage input signals. Each of these switches is connected to an associated pair of a group of selection wires leading to the control station, with the connections between the wires and switches such that each wire is used for several wire pairs and such that the wires of each pair are mutually distinguished by the nature of the input signals.

This invention relates to electrical systems of the kind in which a number of wires are used to transmit electrical signals between a source of such signals and receiving devices located at positions remote from the source. In such systems where a plurality of devices are connected to receive signals from a common source it is necessary to be able to identify from the source each receiving device so that any desired receiving device can be called from the source as and when required. In addition where each of the receiving devices is associated with a considerable number of mechanisms to be supervised and each mechanism has several parts or units for transmitting or receiving signals from the source the number of selection wires required becomes very large. For example in a simple system for controlling and/or monitoring two hundred and fifty mechanisms each with four parts to which control signals have to be transmitted to or received from it is necessary to use one thousand and one wires, of which one is common to all of the parts and the others are connected one to each part.

An object of the present invention is to provide an improved system of the kind referred to in which the total number of wires required is substantially reduced. The system of the invention is particularly suitable, although not so restricted, for use in connection with remote control arrangements for a series of hydraulic mine roof support units provided along a longwall face in an underground mine.

According to the invention a control system for selectively interconnecting one or more of a number of electrical devices to a control station remote from the devices, comprising a plurality of electronic switches each responsive to the simultaneous receipt of two inputs and each switch being associated with a particular one or group of devices and adapted to connect the said particular one or group to the control station, and a plurality of selection wires all connected with said control station the electronic switches being connected to particular combinations of said wires with each combination exclusive to the electronic switch to which the wires forming the combination are connected.

The electrical selection means may comprise two or more devices such as diodes or transistors associated with each switch means and arranged so that they allow current to flow to actuate the switch means only when appropriate electrical potentials are applied to all the selection wires in the exclusive combination allocated to that switch means.

The invention is illustrated by way of example with reference to the accompanying drawings, in which.

Figure 1:
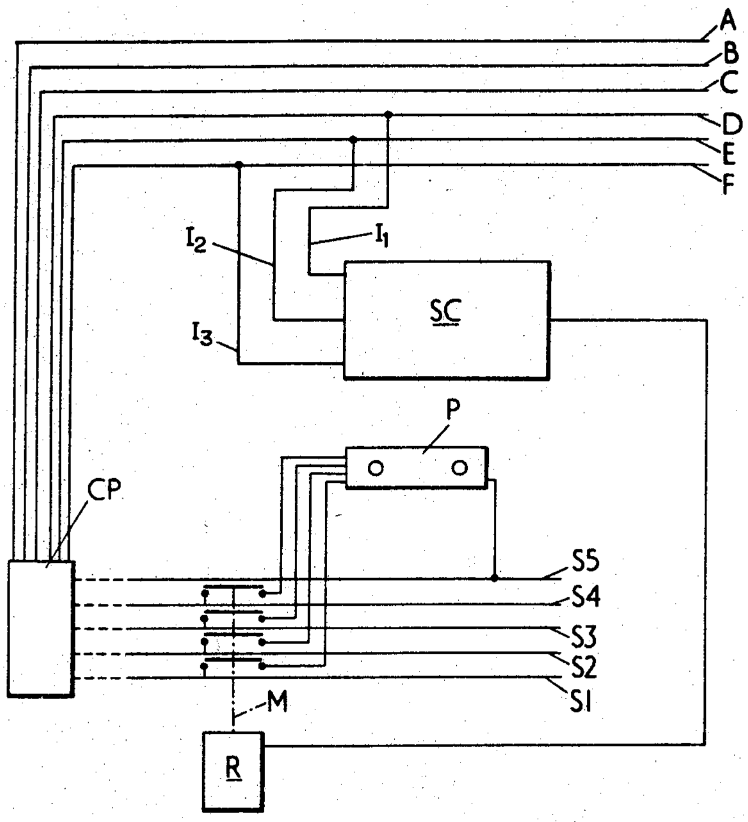
FIGURE 1 is a diagram of a section of a circuit for a control system by which a series of advanceable hydraulic roof support units serving as a roof support arrangement along a longwall coal face may be monitored and controlled from a remote station.

The control system of FIGURE 1 is intended to provide the following four main facilities:

In FIGURE 1 a control station or panel CP is connected to a set of signalling wires $S_1$, $S_2$, $S_3$, $S_4$ and $S_5$. All of the electrical devices, of which only one such device P is shown in the figure, are directly connected to the wire $S_5$, and are selectively connectable through relay contacts $R_1$, $R_2$, $R_3$ and $R_4$ to the wires $S_1$, $S_2$, $S_3$ and $S_4$ respectively. The opening and closing of the relay contacts $R_1$, $R_2$, $R_3$ and $R_4$ is controlled by a relay R which has a mechanical linkage M coupled to the movable parts of the contacts. Each device P of the system has an associated relay R and contacts $R_1$, $R_2$, $R_3$ and $R_4$. When any relay R is operated, any control components or parts of the associated electrical device P coupled to the wires $S_1$, $S_2$, $S_3$ and $S_4$ by the closure of the relay contacts is or are electrically connected to the control panel whereby information can be transmitted between the control panel CP and the device P in question. To enable the relay R associated with any particular electrical device P in the system to be uniquely selected from the control panel CP a device selection arrangement is provided. This selection arrangement includes a group of selection wires A, B, C, D, E and F connected with the control panel. Each relay R is connected to be operated by an associated electronic selection unit circuit SC (there being one such control circuit SC for each relay).

Each selection circuit SC has two control inputs $I_1$ and $I_2$ which are connected to two of the wires A, B, C, D, and E. The wires to which the inputs $I_1$ and $I_2$ are connected form an exclusive combination of selection wires for the selection circuit. In the FIGURE 1 the control input $I_2$ is connected to the wire E and the input $I_1$ is connected to the wire D. In addition, each selection circuit has a further input $I_3$. All of the inputs $I_3$ are connected to the line F, whereby the latter is common to all of the selection circuits used in the system. Each selection circuit SC is responsive to the simultaneous receipt of an alternating voltage on the input $I_2$ and a direct voltage on the input $I_1$. Consequently, if an alternating voltage is impressed on the line E simultaneously with a direct voltage on the line D, the presence of these voltages on these lines will select the selection circuit SC shown on the FIGURE 1, and in consequence operate the associated relay R. If on the other hand the alternating voltage is impressed on the line D simultaneously with a direct voltage on the line E, the selection unit shown in the FIGURE 1 would not be energised, but some other selection unit to which the exclusive combination of alternating voltage on line D, and direct voltage on line E is applicable, would be selected.

Therefore, to select any particular device P, which could be a mine roof support, the appropriate voltages are impressed upon the appropriate pair of selection wires A, B, C, D, and E, either by mechanical adjustment of the control panel CP or by an automatic process, whereupon the relay R associated with the selected roof support unit P is energised and connects the electrical circuits associated with the selected roof support unit P to the four signalling wires $S_1$, $S_2$, $S_3$ and $S_4$, and thus to the control panel CP.

Figure 2:
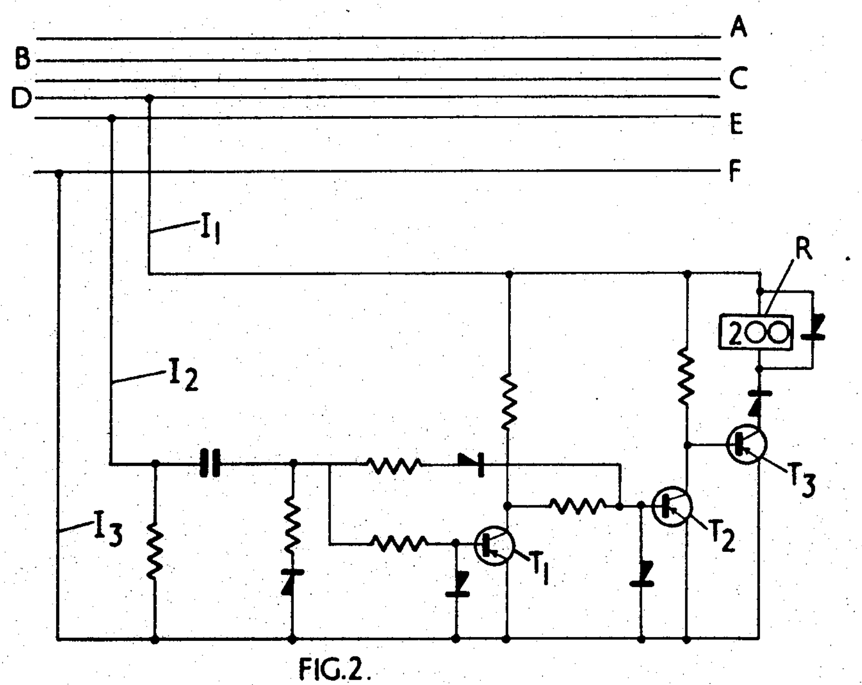
FIGURE 2 is a more detailed diagram of a portion of the circuit of FIGURE 1, and FIGURE 3, is a circuit diagram of modified form of a detail of FIGURE 2.

From FIGURE 2 it will be seen that the selection circuit SC includes a transistorised two input AND gate, which is responsive to the receipt of two inputs $I_1$ and $I_2$, $I_1$ being a direct voltage and the other input $I_2$ being an alternating voltage. The input $I_1$ is connected to line D and the input $I_2$ is connected to the line E. The common line F is connected to the circuit SC by an input $I_3$. The arrangement of the circuit SC is such that it is responsive to a full wave alternating voltage. The transistors $T_1$, $T_2$ and $T_3$ of each circuit SC are so biased by the associated circuit components that the transistor $T_3$ will only deliver an output capable of operating its associated relay when the alternating and direct potentials are present on he associated pair of lines in the correct order.

The circuit of FIGURE 2 operates as follows:

To open the relay R it is necessary to apply a direct current to the relay. The relay cannot operate in the absence of direct current on the line $I_1$ and therefore to the wire D. The relay R is connected in series with the transistor $T_3$ so that when transistor $T_3$ is conducting, the direct current can operate the relay, whereas if the transistor $T_3$ is non-conducting direct current in line $L_1$ cannot operate the relay.

The magnitudes of the various components associated with the transistors $T_1$, $T_2$ and $T_3$ are chosen so that when transistor $T_2$ is conducting the transistor $T_3$ is cut-off, and when the transistor $T_2$ is cut-off, the transistor $T_3$ can be rendered conducting. Thus when direct current only as applied to the circuit the transistor $T_2$ conducts and the transistor $T_3$ is cut-off.

On applying alternating current to the wire E, and thus the line $I_2$, simultaneously with the application of direct current on the line $I_1$ the following operational conditions occur in the circuit.

During the negative going half cycles of the alternating current, the transistor $T_1$ conducts. Whilst the transistor $T_1$ is conducting the transistor $T_2$ is starved of base current and is cut-off (the base current of transistor $T_2$ flowing to the collector of transistor $T_1$). As the transistor $T_2$ is non-conductive, the transistor $T_3$ is able to draw current from line $I_1$ and is rendered conductive, whereby the circuit for the relay R is completed i.e. line $I_1$ relay R, transistor $T_3$ and line $I_3$, to close the switch contacts in the signalling lines S1 to S5.

During the positive going half cycles of the alternating current the latter goes direct to the base of the transistor $T_2$ and biasses the transistor $T_2$ to the cut-off condition whereby the transistor $T_3$ is rendered conductive so that said circuit for the relay R is once again completed. The relay R is of such construction that it does not change its operational state during the period in which the instantaneous magnitude of the alternating current passes through zero. It will thus be clear that the selection circuit SC is essentially a transistorised switching circuit which operates to produce an output on the simultaneous receipt of two inputs. Consequently the switch essentially operates as a two input AND type of gating circuit.

In practice the selection circuit SC associated with a particular support unit P differs from the other selection circuits used in the system only in the magnitude of the circuit component and in the selection circuit.

Figure 3:
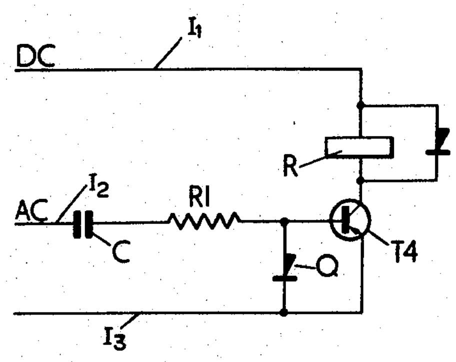

If it is considered convenient for the selection circuit to operate upon a half-wave alternating voltage, the selection circuit SC of FIGURE 2 can be simplified to that shown in FIGURE 3 that is to say the circuit uses a single transistor $T_4$ and associated capacitor $C_1$ resistor $R_1$ and half wave rectifier Q.

As previously stated the drawings illustrate a system using five selection lines A to E thereby allowing 20 permutations. If 16 selection lines are used 240 roof support units can be accommodated in a similar manner.

In practice it is preferred to limit the total number of selection lines to 5 and divide a large number of roof support units into sections of twenty. Each section is then treated as an individual unit. This requires two sets of selection lines, one set for the sections and the other set for the devices or units within a selected section.

From the above it is clear that the control system provides the following four main facilities:

(1) The system enables an operator to establish from the control panel CP electrical contact with any electrical device, i.e. mine roof support unit P in the system: (a support unit with which electrical contact has been made is hereinafter referred to as a selected unit). Electrical signals can then be received from that selected support P and thereby providing indications on the control panel CP of certain selected operational conditions of the selected support unit. For example, an indication of the pressure existing in any of the hydraulic prop legs of the selected support unit may be received as a meter reading at the panel CP; similarly, the extension of the advancing ram of the selected support unit may be indicated on a meter at the panel CP.

(2) The selected support unit P may be caused to undergo certain operations by remote control from the control panel CP. For example, the roof beam or beams of the selected support unit may be lowered, the unit advanced towards the conveyor by a predetermined amount, and the roof beam or beams then reset to support the roof.

(3) The control panel CP may be adjusted to select all the roof support units P in the series one at a time in automatic sequence, each support unit remaining selected for a short interval of time while an automatic check is made of the signals relating to its condition are received from the support unit. If the received signals indicate a satisfactory condition the sequence is allowed to continue to select the next support unit, which is then checked in the same way. If at any point in the sequence a support unit so automatically selected sends back signals indicating that its condition is not satisfactory a warning is given to the operator. The faulty support unit remains selected with the control panel CP indicating the unsatisfactory condition until the operator takes appropriate action. For the purpose of this facility the conditions which would be regarded as satisfactory are predetermined by the operator in making suitable adjustments to the control panel.

(4) The control panel may be adjusted to cause all the support units in the series to carry out a given operation one at a time in sequence without further attention from the operator. For example, adjustment may be made to cause each support unit in turn to lower its roof beam or beams to advance the support unit towards the conveyor by a predetermined amount, and then reset its roof beam or beams against the roof. The adjustment may be made for the sequence of operations to be carried out in either direction through the series of support units.

It is to be understood that the adjustments referred to may be quickly and simply made on the control panel by setting dials and switches.

In the above described system which uses five selection wires A, B, C, D, and E, and a common wire F it is possible uniquely to connect the control station to twenty different electrical devices P. This is because each selection circuit SC is connected to a unique combination of the wires A, B, C, D and E. This means provides the following basic connection possibilities, AB, AC, AD, AE, BC, BD, BE, CD, CE, and DE in which each pair of letters defines the actual wires to which the inputs $I_1$, $I_2$ of the selection circuits SC are connected. However, since each circuit is responsive to the simultaneous receipt of two electrical signals of different characteristics, i.e. one a direct voltage and the other an alternating voltage, the wire combination AB may be distinguished from the combination BA. Consequently, the possible unique combinations becomes twenty for a five wire system. In other words in such a system each one of the wires A, B, C, D, and E can be coupled to eight different switches.

As soon as the relay R is actuated, the closure of the switch M completes the circuit through the signalling lines $S_1$, $S_2$, $S_3$, $S_4$ and $S_5$ and connects the devices on the selected support unit to the control panel.

If it is convenient for the selection circuit to operate upon a half wave alternating voltage, the selection circuit SC of FIGURE 2 can be simplified to that shown in FIGURE 3 that is to say the circuit uses a single transistor $T_4$ and associated capacitor $C_1$ resistor $R_1$ and half wave rectifier Q.

As previously stated the drawings illustrate a system using five selection lines A to E thereby allowing 20 permutations. If 16 selection lines are used 240 roof support units can be accommodated in a similar manner.

In practice it is preferred to limit the total number of selection lines to 5 and divide a large number of roof support units into sections of twenty. Each section is then treated as an individual unit. This requires two sets of selection lines, one set for the sections and the other set for the devices or units within a selected section.

I claim:

1. In a control system for selectively interconnecting a number of electrical devices to a control station remote from the devices, the combination comprising: a control station; a group of selection wires each connected with said control station; a plurality of electronic switches each having first and second inputs connected to exclusive combinations of said selection wires in such a manner that each wire is coupled to at least two different switches, and each responsive to the simultaneous receipt of an electrical signal on each of said inputs, one electrical signal being a direct voltage, and the other electrical signal being an alternating voltage, there being one such switch for each electrical device to be selected; and a control connection between each said switch and its associated device.

2. In a control system as claimed in claim 1, wherein in each exclusive combination of a pair of wires each wire of each pair is uniquely distinguished from the other wire of the pair by the electrical characteristics of the electrical signal impressed upon the wire.

3. In a control system for selectively interconnecting a number of electrical devices to a control station remote from the devices, the combination comprising: a control station; a group of signalling wires connected to said control station; a control switch for each electrical device, each switch having a switched condition in which the associated electrical device is connected to the signalling wires; a group of selection wires each connected with the control station; a plurality of electronic switches each having first and second inputs connected to exclusive combinations of said selection wires in such manner that each wire is coupled to at least two different electronic switches and each responsive to the simultaneous receipt of an electrical signal on each of said inputs, one electrical signal being a direct voltage and the other electrical signal being an alternating voltage, there being one such switch for each electrical device to be selected; and a control connection between each electronic switch and the control switch of the associated device.

References Cited

UNITED STATES PATENTS

| | | | |
|---|---|---|---|
| 3,007,136 | 10/1961 | Tyrlick. | |
| 3,069,655 | 12/1962 | Newbold. | |
| 3,070,778 | 12/1962 | Werme. | |
| 3,205,481 | 9/1965 | Corbella et al. | 340—166 |
| 3,307,148 | 2/1967 | Fukamachi | 340—332 X |
| 3,315,232 | 4/1967 | Feder | 340—166 |

JOHN W. CALDWELL, Primary Examiner

HAROLD I. PITTS, Assistant Examiner

U.S. Cl. X.R.

340—166, 171, 310, 332